US009183755B2

(12) United States Patent
Shi (10) Patent No.: US 9,183,755 B2
(45) Date of Patent: Nov. 10, 2015

(54) SYSTEM AND METHOD FOR LEARNING, COMPOSING, AND PLAYING MUSIC WITH PHYSICAL OBJECTS

(71) Applicant: Zheng Shi, Beijing (CN)

(72) Inventor: Zheng Shi, Beijing (CN)

( * ) Notice: Subject to any disclaimer, the term of this patent is extended or adjusted under 35 U.S.C. 154(b) by 0 days.

(21) Appl. No.: 14/489,199

(22) Filed: Sep. 17, 2014

(65) Prior Publication Data

US 2015/0068387 A1 Mar. 12, 2015

Related U.S. Application Data

(63) Continuation of application No. PCT/CN2014/080317, filed on Jun. 19, 2014, which is a continuation-in-part of application No. PCT/CN2014/079891, filed on Jun. 13, 2014, which is a continuation-in-part of application No. PCT/CN2014/072961, filed on Mar. 6, 2014, which is a continuation-in-part of application No. PCT/CN2014/071850, filed on Jan. 30, 2014, which is a continuation-in-part of application No. PCT/CN2013/072481, filed on Mar. 12, 2013.

(51) Int. Cl.
*G09B 15/02* (2006.01)
(52) U.S. Cl.
CPC .................................... *G09B 15/023* (2013.01)
(58) Field of Classification Search
CPC .............................. G09B 15/02; G09B 15/023
See application file for complete search history.

(56) References Cited

U.S. PATENT DOCUMENTS

| 7,288,705 B1* | 10/2007 | Nelson ............................ 84/10 |
| 7,874,496 B2* | 1/2011 | Keam ........................... 235/494 |
| 8,188,356 B2* | 5/2012 | Rose ............................... 84/447 |
| 8,420,923 B1* | 4/2013 | Choi et al. ..................... 84/644 |
| 8,605,046 B2* | 12/2013 | Lu .................................. 345/173 |
| 8,902,195 B2* | 12/2014 | McGibney et al. ........... 345/175 |
| 2004/0207156 A1* | 10/2004 | Soltys et al. .................. 273/292 |
| 2007/0225055 A1* | 9/2007 | Weisman ....................... 463/11 |
| 2008/0084271 A1 | 4/2008 | Jaeger et al. |
| 2009/0128296 A1 | 5/2009 | Han et al. |

(Continued)

FOREIGN PATENT DOCUMENTS

| CN | 2527324 | 12/2002 |
| CN | 1867383 | 11/2006 |

(Continued)

OTHER PUBLICATIONS

Noteput [vvvv], by Filip Visnjic, pub Jan. 18, 2010, project by Jürgen Graef and Jonas Friedemann Heuer, viewed Jan. 9, 2015.*

(Continued)

*Primary Examiner* — Robert W Horn
(74) *Attorney, Agent, or Firm* — Sheppard Mullin Richter & Hampton LLP (57) ABSTRACT

The present invention discloses a system and method for learning, composing, accessing and playing music. The system includes a plurality of physical objects each includes an identifier and assigned a music-related indicator. The system further includes an interactive surface configured to recognize the identifier and location information relative to the interactive surface of a physical object placed on top of the interactive surface. Upon a plurality of objects being placed on the interactive surface to form a structural pattern, the processor is configured to derive a music piece from the structural pattern.

26 Claims, 6 Drawing Sheets

(56) References Cited

U.S. PATENT DOCUMENTS

| | | | |
|---|---|---|---|
| 2009/0135162 A1* | 5/2009 | Van De Wijdeven et al. | 345/175 |
| 2009/0293704 A1* | 12/2009 | Neil | 84/471 R |
| 2010/0079409 A1* | 4/2010 | Sirotich et al. | 345/175 |
| 2011/0252946 A1* | 10/2011 | Armstrong | 84/483.2 |
| 2012/0139835 A1* | 6/2012 | Morrison et al. | 345/157 |
| 2013/0302763 A1* | 11/2013 | Edwards et al. | 434/159 |
| 2014/0354565 A1* | 12/2014 | Yoon | 345/173 |
| 2015/0068387 A1* | 3/2015 | Shi | 84/471 R |
| 2015/0095883 A1* | 4/2015 | Shi | 717/109 |

FOREIGN PATENT DOCUMENTS

| | | |
|---|---|---|
| CN | 101637655 | 2/2010 |
| CN | 102455930 | 5/2012 |
| CN | 103092277 | 5/2013 |
| CN | 202933472 | 5/2013 |
| WO | WO2009149112 | 12/2009 |

OTHER PUBLICATIONS

Fiducials, symbols copyright 2009 by Reactable Systems for object tracking designed as a toolkit for the rapid development of table-based tangible user interfaces.*

International Search Report for PCT Application No. PCT/CN2013/072481 filed Mar. 12, 2013, dated Jan. 2, 2014.

International Search Report and Written Opinion for PCT Application PCT/CN2014/081721, filed Jul. 7, 2014, dated Nov. 14, 2014.

* cited by examiner

SYSTEM AND METHOD FOR LEARNING, COMPOSING, AND PLAYING MUSIC WITH PHYSICAL OBJECTS

CROSS-REFERENCE TO RELATED APPLICATIONS

This application is a continuation of International Patent Application No. PCT/CN2014/080317, entitled "System and Method for Learning, Composing, and Playing Music with Physical Objects", filed Jun. 19, 2014, which is a continuation in part of International Patent Application No. PCT/CN2014/079891, entitled "System and Method for Operating a Computer Program with Physical Objects", filed on Jun. 13, 2014, which is a continuation in part of International Patent Application No. PCT/CN2014/072961, entitled "System and Method for Identifying an Object's ID and Location Relative to an Interactive Board," filed on Mar. 6, 2014, which is a continuation in part to International Patent Application No. PCT/CN2014/071850, entitled "System and Method for Identifying an Object's ID and Location Relative to an Interactive Board," filed on Jan. 30, 2014, which is continuation in part of International Patent Application No. PCT/CN2013/072481, entitled "System and Method for Interactive Board," filed on Mar. 12, 2013. The entire disclosures of each of the above applications are incorporated herein by reference.

TECHNICAL FIELD

The present invention and its embodiments relates to the field of music application on electronic devices, and more particularly, an interactive surface using cards to compose and play music.

BACKGROUND

Music is the one of the most magnificent creations of the human race. Music is expressed in complex forms, syntaxes, colors and articulations that are rooted both in the human biology and elegant mathematics.

Learning, composing, accessing and playing music are among the most fundamental human activities. Other than being an art form practiced by professional musicians and enjoyed by almost everyone else in the world, numerous studies have shown that music is greatly beneficial to the cognitive development of children.

Because of the advancement in technology over the last century, there is now little barrier for accessing and enjoying music. Music is performed in concert halls and recording studios; performance is recorded, stored and disseminated via a great variety of formats and channels. Consequently, almost any music is available at any time in any place to anyone with reasonable access.

Nonetheless, despite such technological advancement over the last century, there is still plenty of improvement potential for assisting learning and composing music by both professionals and novices, by the very senior and the very young, including as young as 2 to 3 years of age when the children have already developed an interest in music.

We see three major barriers to learning and composing music.

1. Skill required. The most commonly practiced format of learning music is the learning of a particular musical instrument. For example, parents often engage piano teachers to teach their children piano, while musicians play the piano to compose musical notes. Needless to say, it takes years of vigorous practice to become good at playing piano at the amateur level, a process quite often forced upon the children by the parents which costs time, money and possibly the children's very interest in music. It takes tremendous practice and sacrifice to become a pianist.

2. Tools available. Being good at one musical instrument does not readily give one the ability to compose a music piece, with the full range of tunes and rhythms. For example, being good at piano does not readily enable someone to compose music with the drum, the trumpet, or the violin. The popular software program GarageBand by Apple Inc. allows the user to create music with elements of percussion, wind and string instruments; however, the functionality in GarageBand relating to the construction of original music leaves much to be desired.

3. Music syntax. The syntax of music is highly complex. Terms such as chord, diatonic chord, accidental, major and minor and their many types, variations, equivalency and inversions are simply beyond the grasp of most children and the vast majority of the people who are not professional musicians and have not learned the intricacies of music theories. While anyone can "create music" by singing into a microphone or hitting a few keys on the electronic piano, without the precise language of music syntax, such rudimentary recording cannot be precisely described, nor can it be dissected, analyzed, or further improved upon.

We therefore see the need to create a system that greatly reduces the skills required for learning and creating music, that makes the entire range of musical instruments easily available, and that allows sophisticated structure and complex syntax to be created based more on one's appreciation and imagination in music and less on one's mastery of the music syntax.

SUMMARY OF INVENTION

The present invention discloses a system and method for learning, composing, accessing and playing music. The system comprises: a plurality of objects configured to be placed next to or on top of each other to form a structural pattern, each object comprises an identifier and assigned a music-related indicator; an interactive surface configured to recognize the identifier and location information of an object placed on the interactive surface; a processor operatively linked to the interactive surface; a memory operatively linked to the processor and configured to store a database of correlation relationship between identifier and music-related indicator; and an acoustic or visual device so as to supply real-time feedback to the user.

In accordance with one embodiment of the present invention, once two or more objects are placed on the interactive surface, they form a structural pattern and the processor is configured to derive a music piece from the structural pattern.

In accordance with one embodiment of the present invention, a music-related indicator is derived from a music symbol, an Arabic numeral, a color, an icon, a figure, or a figurine that can be interpreted as a symbol of music syntax. A music symbol may be one of the followings: a single music note with pitch and duration; a single chord with the music note being the root; a rest and the duration of rest; accidentals that alter the pitch of a music note; dots or ties that modify the duration of a music note; major chords, minor chords, triad chords or seventh chords; key signatures that define the music piece being a major scale or a minor scale; raising or lowering the pitch of a music note in the same pitch class; symbols that define the texture, timbre, dynamics and articulation of the music piece, including those that are commonly used and those custom designed to enhance the music for a particular audience, sentiment and purpose.

A music-related indicator can also be a symbol chosen among a plurality of programming functions, including: start, end, repeat, condition, and jump that organize indicators into a structural pattern to be translated into a music piece by the processor; toggle, that, when used together with a music symbol, allows each of the variations of the symbol to be presented and chosen; equal and assign, that enable one object to be assigned to represent a first structural pattern, with the resulting object capable of being incorporated into a second structural pattern; record, retrieve, save, cancel, delete, group, ungroup, connect, disconnect, combine, and separate, that manage a music piece as an electronic file, and enable the synthesis of a larger music piece from a plurality of music pieces.

A music-related indicator can also be a symbol that represents musical instruments, including percussion, wind and string instruments, and a symbol that represents human voices and sounds from nature.

In accordance with one embodiment of the present invention, an identifier of an object is defined by a unique optical pattern of the object.

The unique optical pattern can be a marking of music notation, a marking of linguistic or mathematical notation, a marking of icons or graphics, or a unique pattern of 2D or 3D shape, color and texture visible or invisible to the human eye. Such identifiers are either pre-fabricated on the object, or marked on the object by a user with such marking being either permanent or erasable.

In accordance with one embodiment of the present invention, a camera affixed or otherwise operatively linked to the processor can recognize the unique optical pattern, and transmit that information to the processor. The processor further accesses a database of correlation relationship between identifiers and music-related indicators stored in memory, and matches a music-related indicator for each identifier that the processor has recognized. The processor further deduces the music piece from the structural pattern formed by a plurality of objects, based on the music-related indicators that are associated with the identifiers and the locations of each of the objects in the structural pattern.

In accordance with one embodiment of the present invention, an identifier of an object can also be defined by a unique identification code (UID) that is embedded in the object.

The UID can be encoded with a radio frequency identification chip, a unique pattern of capacitive tabs, or a unique pattern of magnetic tabs.

In this embodiment, the interactive surface recognizes the UID of the object via a radio frequency antenna, an array of capacitive sensor switches, or an array of magnetic sensor switches, and transmits that information to the processor. The processor further accesses a database of correlation relationship between identifiers and music-related indicators stored in memory, and matches a music-related indicator for each identifier that the processor has recognized. The processor further deduces the music piece from the structural pattern formed by a plurality of objects, based on the music-related indicators that are associated with the identifiers and the locations of each of the objects in the structural pattern.

The identifier of an object can also be a music-related indicator assigned to the object.

In accordance with one embodiment of the present invention, an object is a button, a card, a block, a figurine, or another 2D or 3D block structure that are amenable to be placed next to each other or on top of one another to form clearly recognizable 2D or 3D structural patterns, both the human eye and to the sensors and antennas of the interactive surface.

In accordance with one embodiment of the present invention, an object can also be a physical sheet placed on top of or next to the interactive surface, with music-related indicators printed on such physical sheet and incorporated into the structural pattern that processor translates into a music piece.

In accordance with one embodiment of the present invention, an electronic screen can be operatively linked to the interactive surface; with music-related indicators displayed on such electronic screen and incorporated into the structural pattern that processor translates into a music piece.

In accordance with one embodiment of the present invention, sensory accessories are operatively linked to the processor and provide interactive feedback to the user.

In some embodiments, the sensory accessory is an audio device that can play the sound of the music piece generated by the processor.

In some embodiments, the sensory accessory is a visual device that can show the notation of the music piece generated by the processor, with such notation written with typical Western music symbols such as ABCDEFG, staffs, clefs, notes, chords, rests, breaks, accidentals, and time signatures, or with typical Solfège music symbols such as Do, Re, Mi, Fa, Sol, La, Ti (or Si), or with simplified numerical music symbols such as 1, 2, 3, 4, 5, 6, 7.

BRIEF DESCRIPTION OF THE DRAWINGS

To better illustrate the purposes, principles, concepts and advantages of the embodiments of the present invention, particularly how the embodiments of the present invention provide a novel and valuable user experience, various embodiments are further described in connection with the appended drawings. These drawings only serve as exemplary embodiments of the present invention and are not intended to limit the scope of the present invention.

DETAILED DESCRIPTION OF THE INVENTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the present invention.

Figure 1:
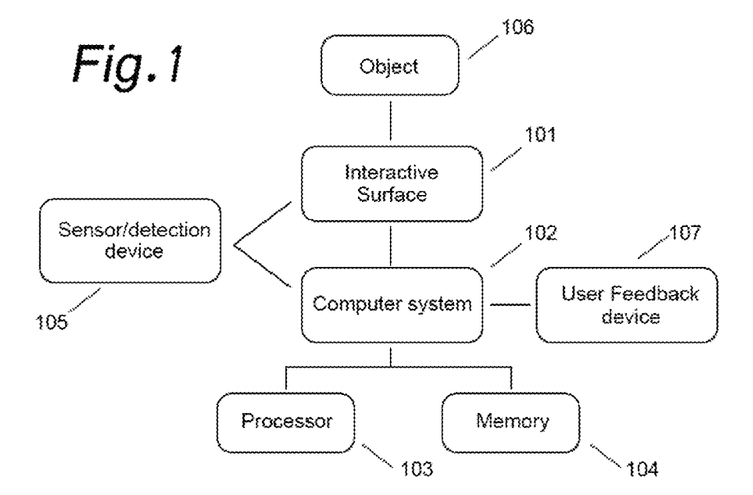
FIG. 1 is an exemplary schematic diagram illustrating the system process flow in accordance with one embodiment of the present invention.

FIG. 1 is an exemplary schematic diagram illustrating the system process flow in accordance with one embodiment of the present invention.

FIG. 1 illustrates the core system and method of the present invention. The system consists of an interactive surface 101 that is operatively linked to a computer system 102, which consists of a processor 103 and a memory unit 104. The interactive surface 101 further comprises of a sensor or detection device 105 that is operatively linked to the computer system 102 of the interactive surface 101. The sensor or detection device 105 is configured to detect the location and unique ID of an object 106 placed on or near the interactive surface 101. The system described in FIG. 1 further consists of a user feedback device 107 such as audio speakers and/or lighting devices that are operatively linked to the computer system 102.

Figure 2:
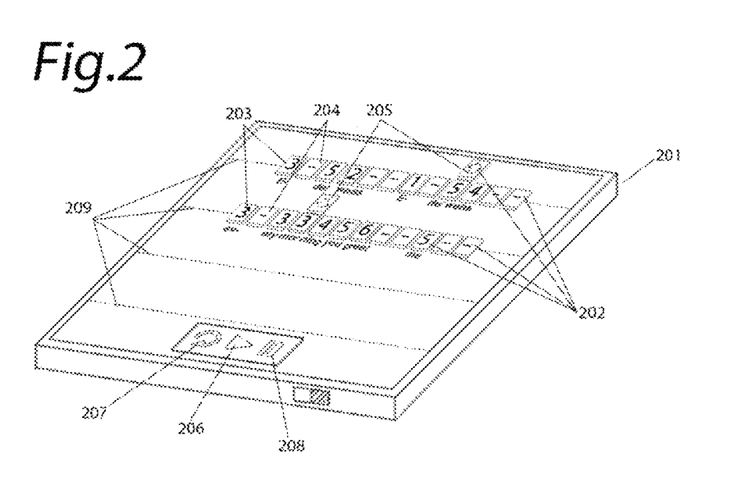
FIG. 2 is an exemplary schematic diagram of the system in accordance with one embodiment of the present invention.

FIG. 2 is an exemplary schematic diagram of the system in accordance with one embodiment of the present invention, illustrating the process of creating a music piece using the system design described in FIG. 1. In the example embodiment illustrated in FIG. 2, one can notice that the melody created is that of the first eight measures of the famous Edelweiss melody from the show tune from the 1959 Rodgers and Hammerstein musical "The Sound of Music."

In order to create this melody, the cards 202 imprinted with musical-related indicators are placed on the interactive surface 201. Some of these cards 202 are music note cards 203 that use the simplified numerical representation of the seven music notes. Other cards 204 are imprinted with music rhythm-related indicators ('-' in this case representing the indicator for one beat), whereas some other cards 205 are pitch changing cards that are used to alter the pitch on musical note cards 203.

The bottom of the interactive surface 201 in FIG. 2 also has function buttons for the user to interact with, including the play button 206, the replay button 207 and the pause button 208.

In order to create a melody using the embodiment described in FIG. 2, a user places music note, rhythm and pitch-altering cards 202 on top of the interactive surface 201 along the music progression lines 209 (except for pitch-altering cards 205 that are placed above music note cards 203).

Once the cards 202 are appropriately placed on top of the interactive surface 201, the sensor or detection device picks up the UID of the cards 202 as well as it relative location vis-à-vis the surface of the interactive surface 201 and transmits this information to the computer system. The information is then stored in the computer system's memory unit. As a user places more and more cards 202 on top of the interactive surface 201 along the music progression lines 209, the computer system will store within its memory the accompanying string of music notes, rhythm and pitch-modifying cards 202 and deduce in real-time the music melody that the user is creating.

Finally, once a user is satisfied with the pattern of music cards 202 that he/she has created, the user can press the play button 206 in order to have the computer system play the melody back to the user via the feedback device, which typically consists of acoustic speakers.

Although the embodiment described in FIG. 2 is a good illustration for creating music, the embodiments of the present invention can also include a number of add-ons in order to have a more complete and inclusive music creating device.

Figure 3:
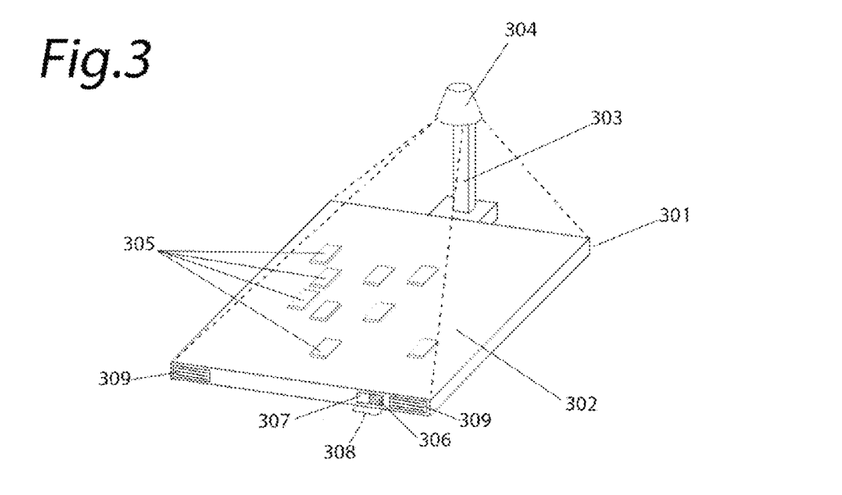
FIG. 3 is an exemplary schematic diagram of the system in accordance with one embodiment of the present invention.

FIG. 3 is an exemplary schematic diagram of the system in accordance with one embodiment of the present invention, illustrating an example system embodiment with increasing sophistication as compared to FIG. 2. The interactive surface 301 is operationally linked to the computer system 308 consisting of both a processor 306 and a memory unit 307. A camera 304 (also operatively linked to the computer system 308) is set on top of pillar 303 which is affixed on the side of the interactive surface 301 in such a manner that the camera 304 has an overview of the whole area of the interactive surface 301. Objects such as cards 305 that are placed on top of the interactive surface are immediately detected by the camera 304 and the indicators printed on these cards 305 are recognized by the computer system 308 via the camera 304. Thus, the location and orientation of an object relative to the interactive surface 301 as well as the type of identifier (i.e., indicator) is recognized by the computer system 308. The computer system 308 is also operatively linked to a speaker system 309 so as to provide audio feedback to the user.

In the embodiment described in FIG. 3 the identifier is the same as the music-related indicator, whereas this would not be the case in an embodiment whereby the system uses RFID chips embedded into the cards in order to wireless communicate the card's UID with the computer system of the interactive surface. In such an instance, the location and orientation of the card would be determined by a set of sensors embedded across the surface of the interactive surface.

Another system embodiment has an interactive surface with an array of sensors designed to be able to accurately detect the UID, location and orientation information of an object placed upon the interactive surface.

Another system embodiment has an electronic screen as the interactive surface. This embodiment offers a large number of benefits in terms of both cost and ease of the information dissemination to the user.

Despite the various technologies and designs for the interactive surface, for the sake of simplicity, the present invention will be described using the system design illustrated in FIG. 3 (i.e., using a camera to detect a card's identifier/indicator, location and orientation information).

Figure 4:
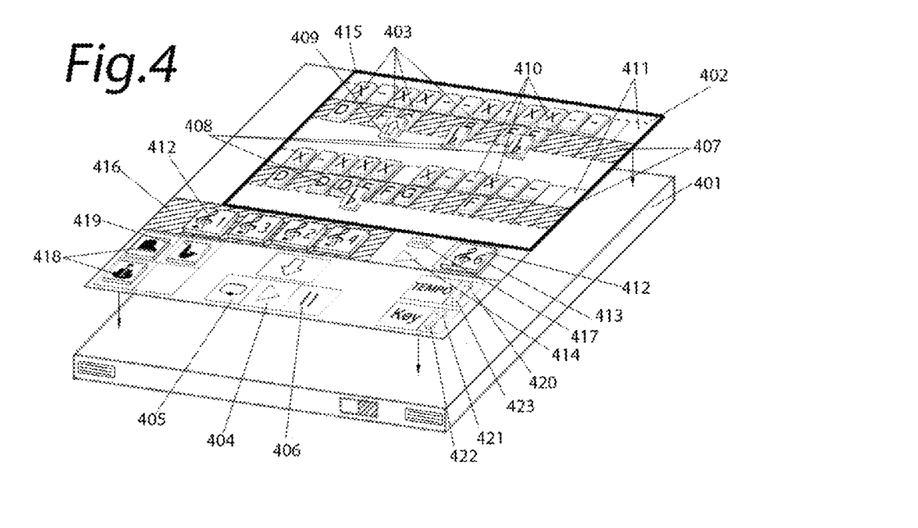
FIG. 4 is an exemplary schematic diagram illustrating a close-up of the interactive surface with a music sheet placed on top of the interactive surface and a group of cards with various music-related indicators printed on them neatly placed on the music sheet in accordance with another embodiment of the present invention.

FIG. 4 is an exemplary schematic diagram illustrating a close-up of the interactive surface with a music sheet placed on top of the interactive surface and a group of cards with various music-related indicators printed on them neatly placed on the music sheet in accordance with another embodiment of the present invention.

Using the system described in FIG. 3, FIG. 4 further depicts a close-up of the interactive surface 401 with a music sheet 402 placed on top of the interactive surface 401, and a selection of cards 403 with various music-related indicators printed on them neatly placed on the music sheet 402. In this particular embodiment, a music piece is created through the use of the 7 music notes (i.e. the cards with the letters C, D, E, F, G, A or B printed on them) as well other music-related cards.

The embodiment depicted in FIG. 4 illustrates how a user could place the selection of cards 403 in the music creation area 415 to create a simple melody. Once a user has placed the cards on top of the music sheet 402 they can proceed to play their melody (by pressing the play 404 button), replay their melody (by pressing the replay button 405) or pause their melody (by pressing the pause button 406).

The cards 403 of the present invention each have a different music-related indicator printed on its surface. These indicators can take various forms and patterns and serve different functions. The cards can best be described as belonging to the following categories: music note; pitch modification; rhythm; melody; instrument; and chord.

1. Music Note Cards

These cards 403 are the core element of any music piece. They are placed along the dashed lines 407 on the music sheet 402 depicted in FIG. 4.

Figure 5:
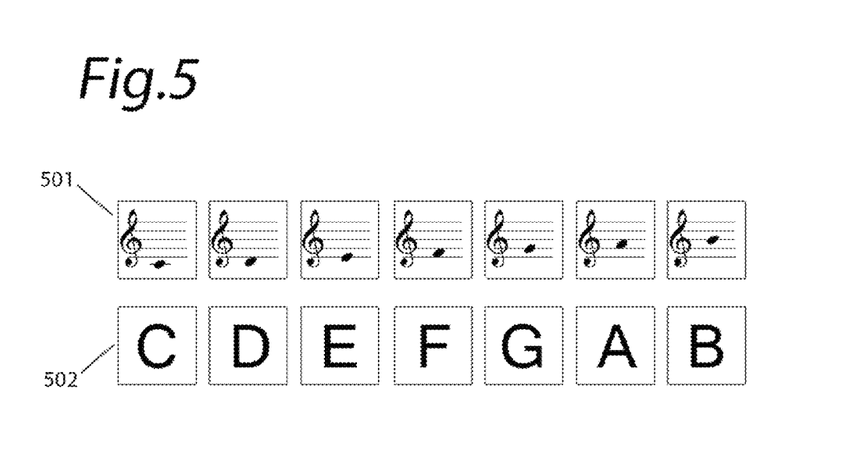
FIG. 5 is an exemplary schematic diagram illustrating two sets of designs for the seven music notes in the chromatic scale in accordance with one embodiment of the present invention.

FIG. 5 is an exemplary schematic diagram illustrating two sets of designs for the seven music notes in the chromatic scale in accordance with one embodiment of the present invention.

The present embodiment comprises two different designs for the music note cards: staff notation and letter notation. These two sets of designs are depicted in FIG. 5 where each set of cards represent the same seven music notes in a chromatic scale.

Referring to FIG. 5, the top and bottom two cards 501, 502 on the left hand-side depict the same note, Middle C, with two styles of presentation. The top left-hand card 501 depicts the Middle C note using the staff notation with the pitch location and the bottom-left hand card 502 depicts the same Middle C note using the pitch name C. It will be noted that both designs are acceptable as the camera 304 and computer system 308 described in FIG. 3 are customized to recognize these indicators as the identifiers for these cards.

Interestingly, if a user places the 7 cards (using either design) in the same order as depicted in FIG. 5 on top of the music sheet 402 (that is itself placed on top of the interactive surface 401) within the dashed lines 407 designed for music note cards, and then proceeds to press the play button 404, then, the computer system will successively play the solfège Do Re Mi Fa Sol La Si melody.

2. Pitch Modification Cards

These cards 408, 409 are used to change the pitch of an individual music note card 403. The present embodiment of the invention envisages these particular cards 408, 409 to be placed on top or superimposed on individual music note cards 403. This action would be instantly recognized by the camera 304 and the computer system 308 and the pitch of a melody would then change accordingly.

Figure 6:
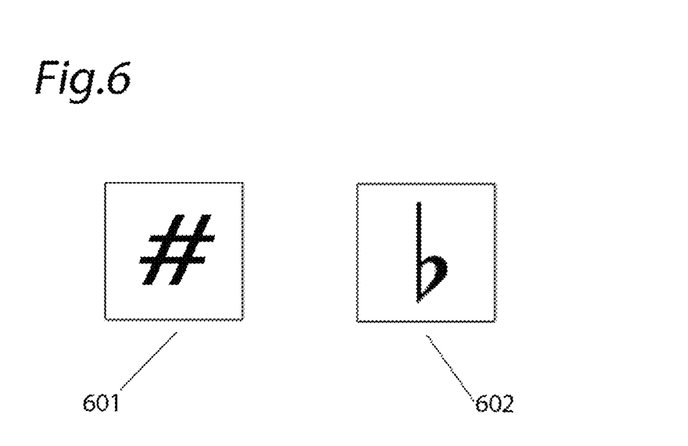
FIG. 6 is an exemplary schematic diagram illustrating the design of the two cards used to change the pitch of a music note by half a step on the chromatic scale in accordance with one embodiment of the present invention.

FIG. 6 is an exemplary schematic diagram illustrating the design of the two cards used to change the pitch of a music note by half a step on the chromatic scale—the accidentals, in accordance with one embodiment of the present invention.

The present embodiment includes two different types of Pitch Modification cards; cards that change the pitch on a music note by half a step on the chromatic scale and cards that change the pitch on a music note by an octave.

The symbol on the first card 601 in FIG. 6 is an exemplary schematic diagram illustrating the design for the sharp accidental used to raise the pitch of the music by half a step. The symbol on the second card 602 in FIG. 4 is the design used for the flat accidental used to lower the pitch by half a step.

Figure 7:
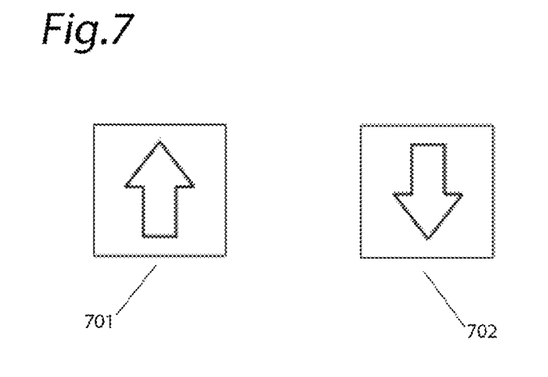
FIG. 7 is an exemplary schematic diagram illustrating the design of the two cards used to change the pitch on a music note by an octave on the chromatic scale in accordance with one embodiment of the present invention.

FIG. 7 is an exemplary schematic diagram illustrating the design of the two cards used to change the pitch on a music note by an octave on the chromatic scale in accordance with one embodiment of the present invention.

Referring to FIG. 7, the symbol on the first card 701 is an exemplary schematic diagram illustrating the design for raising the music note by an octave higher whereas the symbol on the second card 702 is the design used to lower the music note by an octave.

Referring back to FIG. 4, one can see how the present embodiment would use Pitch Modification cards described in FIG. 6 and FIG. 7 to change the pitch of a music note card 403. Three cards 408 whose indicators have been denoted in FIG. 6 as the symbol for a flat accidental have been placed on top of three note cards 403. Also, a card 409 whose symbol has been denoted in FIG. 7 as the symbol for raising the music note by an octave higher has been placed on top of another note card 403.

In effect, superimposing these Pitch Modification cards 408, 409 upon note cards 403 causes the music notes in question to modify their pitch according to the pitch modification card indicator read by the computer system 308, via the camera 304. The computer system 308 will then instruct the speakers 309 to play the modified melody next time a user presses the play 404 or replay 405 buttons.

3. Rhythm Cards

Referring to FIG. 4, these cards 410 are used as indicators of rhythm and duration of music notes 403. The present embodiment of the invention envisages these particular cards 410 to be placed directly above individual music note cards 403 in the spaces denoted in the empty lines 411. It is important to point out that unlike the music note cards 403 which do not need to fill every box of the dashed lines 407, rhythm cards 410 need to fill in each box of the unfilled lines 411 situated above the music note card dashed lines 407. Furthermore the boxes of unfilled lines 411 that represent the rhythm must mirror the boxes on the music note dashed lines 407. Therefore, as illustrated in FIG. 4, rhythm cards are lined up on the unfilled lines 411 in order to create the rhythm of the melody.

Again, as with the music card 403 and pitch modification cards 408, the instant a rhythm card 410 is placed on the rhythm unfilled lines 411, the computer system 308, via the camera 304, recognizes the symbols printed on top of the rhythm cards 410 and proceeds to process the information.

The present embodiment includes a number of different indicators for rhythm cards 410; each having different functions.

Figure 8:
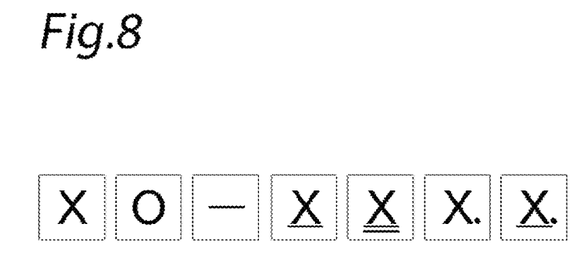
FIG. 8 is an exemplary schematic diagram illustrating the design for symbols printed on the cards that are indicators of rhythm and duration of a music note in accordance with one embodiment of the present invention.

FIG. 8 is an exemplary schematic diagram illustrating the design for symbols printed on the cards that are indicators of rhythm and duration of a music note in accordance with one embodiment of the present invention. Anyone skilled in the art will recognize that the indicators illustrated in FIG. 8 are an international standard (widely used in Asian countries) for denoting rhythm and duration of music notes. Therefore, the author will not proceed to further explain the effect of these various symbols upon a melody.

4. Melody Cards:

4.1. Assigning a Melody to a Melody Card:

Once a user has placed the Music Note 403, Pitch Modification 408, and Rhythm cards 410 upon the music sheet 402

(itself placed on top of the interactive surface 401) and is satisfied with the melody segment that he/she has created, they can choose to save this segment through the use of Melody cards 412.

Referring to FIG. 4, these Melody cards 412 are placed at the bottom line of the music sheet 402. Assuming that the user would like to save the melody segment they have created in the example depicted in FIG. 4, all required for the user is to place a Melody card 412 in the square area 413 depicted at the bottom right of the music sheet 402. Adjacent to this square area 413 is a button with the symbol ">" 414 where the user assigns the Melody card 412 placed on the square area 413 with the melody that has been created on the board (through the use of music note, pitch modifications, and rhythm cards). Therefore, as illustrated in FIG. 4, the various music indicator cards are lined up in the "melody creation area" 415 (depicted by the area within the thick lined square) and the user then proceeds to assign this melody to the Melody card 412 numbered 6.

4.2. Assigning Multiple Melodies to a Melody Card:

By the same approach described above, once multiple melodies have been assigned to multiple Melody cards 412, these multiple melodies can then be assigned to one Melody card.

In order to do so, all a user needs to do is to place sequentially multiple Melody cards 412 (each with a melody already assigned to it) into the "melody creation area" 416 depicted by the lowest dashed line of the music sheet 402. Once again, the user then proceeds to place a new Melody card 412 on top of the square area 413 on the right of the dashed line 416 and then press the "=" button 417 adjacent to it. This will cause the sequence of the melody cards placed on the dashed line 416 to be assigned to the new melody card and the main theme of a complete music piece is created.

5. Instrument Cards

These cards 418 are used to indicate to the computer system 308 which musical instrument should be used to play the melody created in the melody generation area 415. Referring back to FIG. 4, one can see that three Instrument cards 418 have been placed in the designated Instrument Assignment area 419 at the very bottom left of the music sheet 402. For this embodiment of the invention, only four instrument cards 418 can be used simultaneously to play a specific melody and in the example illustrated in FIG. 4, the Instrument cards 418 for the piano, the trumpet and the guitar have been selected. This would imply that if the user presses on the play 404 or replay 405 buttons then the melody created in the melody creation area 415 will be played using the acoustics of a piano, a trumpet and a guitar simultaneously.

Figure 9:
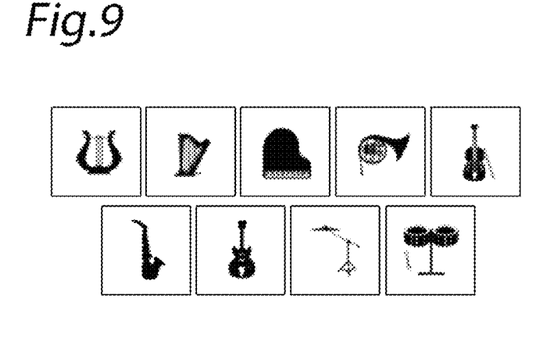
FIG. 9 is an exemplary schematic diagram illustrating the design for instrument cards in accordance with one embodiment of the present invention.

FIG. 9 is an exemplary schematic diagram illustrating the design for instrument cards in accordance with one embodiment of the present invention.

6. The Tempo Buttons

In order for a user to modify the tempo (i.e., beats per minute) of the melody generated in the melody creation area, the user simply presses either the TEMPO up 420 or TEMPO down 423 buttons located at the bottom right-hand side of the music sheet 402. Interacting with these keys will increase or slow the tempo of the melody created in the melody creation area 415.

7. Key Buttons

In order for a user to modify the musical tonality of the melody generated in the melody creation area, the user simply need to press either the KEY up 421 or KEY down 422 buttons located at the bottom right-hand side of the music sheet 402. Interacting with these keys will raise or lower the position of the entre chromatic scale of the melody created in the melody creation area 415.

8. Chord Cards

The present embodiment of the invention also allows for chords to be used with the music sheet 402 through the use of Chord cards.

Figure 10:
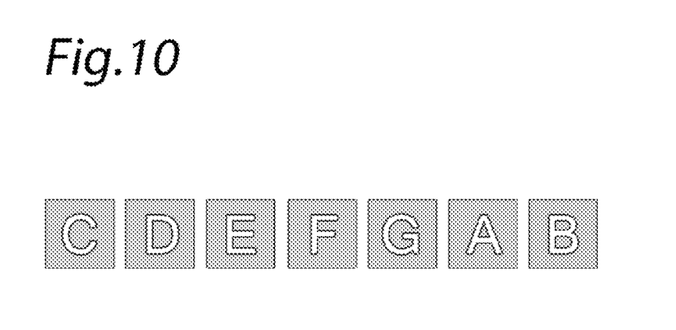
FIG. 10 is an exemplary schematic diagram illustrating the design of the chord cards based on the root note in the chromatic scale in accordance with one embodiment of the present invention.

FIG. 10 is an exemplary schematic diagram illustrating the design of the chord cards based on the root note in the chromatic scale in accordance with one embodiment of the present invention.

Referring to FIG. 10, one can see the design of chord cards is based on the root note in the chromatic scale. These cards are used in the same way Music Note cards are used in FIG. 4.

Figure 11:
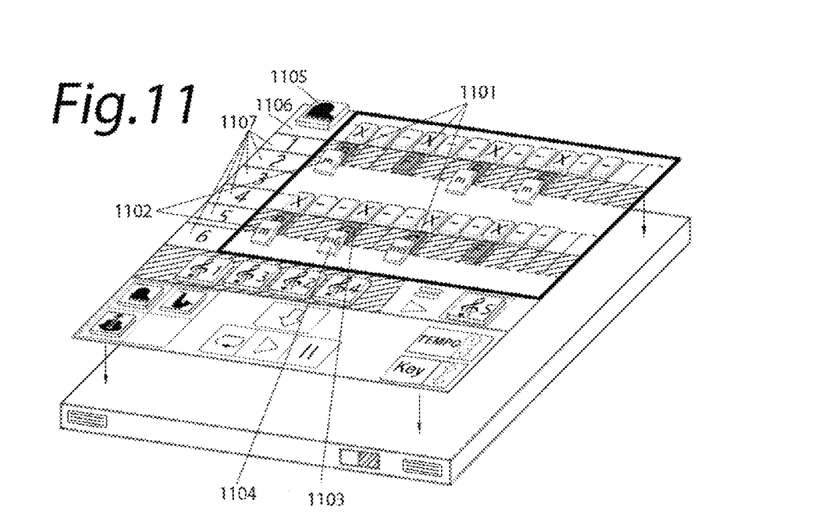
FIG. 11 is an exemplary schematic diagram illustrating a close-up of the interactive surface with a music sheet placed on top of the interactive surface and also a group of cards with various music-related indicators printed on them neatly placed on the music sheet using chord cards in accordance with one embodiment of the present invention.

FIG. 11 is an exemplary schematic diagram illustrating a close-up of the interactive surface with a music sheet placed on top of the interactive surface and also a group of cards with various music-related indicators printed on them neatly placed on the music sheet using chord cards in accordance with one embodiment of the present invention.

Referring to FIG. 11, one can see how that the Chord cards 1101 based on the root note in the chromatic scale are placed in the melody creation area in order to create a more complex melody structure.

Figure 12:
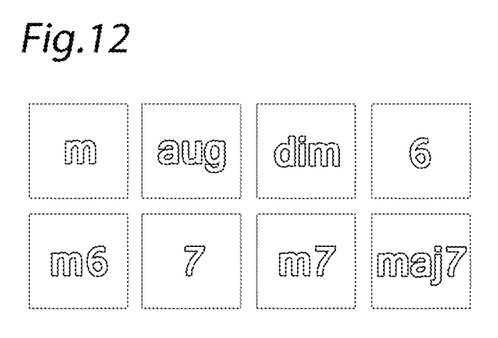
FIG. 12 is an exemplary schematic diagram illustrating the design for chord variation cards based on a common root according to one embodiment of the present invention.

FIG. 12 is an exemplary schematic diagram illustrating the design for chord variation cards based on a common root according to one embodiment of the present invention.

Referring to FIG. 12 one can note that the symbols used on these Chord Variation cards are international standards (e.g. m—minor triad; aug—augmented triad; dim—diminished triad . . . etc) and will not be further explained within the scope of this document.

Referring back to FIG. 11, the Chord Variation cards 1102 are used in much the same manner Pitch Modification cards 408 are used in FIG. 4. That is to say that a user superimposes them on top of the Chord cards 1101 in order to form a specific triad. For example, looking at the Chord card C 1103 which is a major triad in G Major, one can notice that the user has superimposed the Chord Variation card m6 1104 on this Chord card 1103. The result is that the G major triad is now transformed into a G minor $6^{th}$ triad.

9. Texture Modification

Finally the texture of the melody can be modified by placing a Music Instrument card 1105 within the designated area 1106 and then selecting one of the 6 instrument style option buttons 1107 located on the left hand-side of the melody creation area. For example, referring back to FIG. 11, a Piano Music Instrument Card 1105 has been placed in the designated area. Thus, a user could then proceed to select a different piano style by pressing any of the option buttons 1107. For example, the option button 1107 labeled 1 would play the grand piano, the option button 1107 labeled 2 would play the electric piano, and the option button 1107 would play the organ.

Furthermore, in the case that no Instrument Card 1105 is placed on the designated area 1106; then the user can select any 6 Chord styles (e.g., arpeggio, rolling of the octaves, etc.) by pressing any of the option button 1107.

The invention claimed is:

1. A system for learning, composing and playing music, comprising:
a plurality of objects configured to be placed next to or on top of each other to form a structural pattern, wherein each object comprises an identifier, is assigned with a music-related indicator, and is selected from a group consisting of a note rhythm object, a music pitching defining object and a music control object;
an interactive surface configured to recognize the identifier and location information of an object placed on or near the interactive surface;
a physical sheet configured to cover the interactive surface, comprising a first area labeled with graphics delineating a series of placement spaces for receiving a series of note rhythm objects and musical pitch defining objects, and a second area for receiving a series of music control objects;
a processor operatively linked to the interactive surface; and
a memory operatively linked to the processor and configured to store a database of correlation relationship between identifier and music-related indicator,
wherein upon the plurality of objects being placed on or near the interactive surface to form a structural pattern, the processor is configured to derive a music piece from the structural pattern, and wherein the note rhythm objects and the music pitching defining objects in the first area define music notes and their durations in the musical piece, and the music control objects in the second area control playback sounds to be produced for the music piece and trigger the starting and stopping of the playback sounds.

2. The system of claim 1, wherein the music-related indicator of a first object comprises a music symbol, and the processor is configured to derive the music piece in accordance with the music symbol and the location information of the first object.

3. The system of claim 2, wherein the music-related indicator for a second object comprises a programming symbol, and upon the first object and the second object being placed on or near the interactive surface, the processor is configured to program the music symbol of the first object in accordance with the programming symbol of the second object.

4. The system of claim 2, wherein the music-related indicator for a third object comprises a music instrument symbol, and upon the first object and the third object being placed on or near the interactive surface, the processor is configured to derive the music piece in accordance with the music symbol of the first object and the music instrument symbol of the third object.

5. The system of claim 1, wherein the identifier of the object comprises a unique identification code (UID), and the UID is encoded with a device selected from a group consisting of a radio frequency identification chip, a pattern of capacitive tabs, and a pattern of magnetic tabs.

6. The system of claim 1, wherein the identifier of the object correlates to a unique optical pattern, and the interactive surface is configured to recognize the unique optical pattern through a camera or a sensor array operatively linked to the interactive surface.

7. The system of claim 6, wherein the unique optical pattern is pre-fabricated on the object.

8. The system of claim 6, wherein the unique optical pattern is a marking on the object by a user.

9. The system of claim 1, wherein the identifier of the object is a music-related indicator assigned to the object.

10. The system of claim 1, further comprising an electronic screen operatively linked to the interactive surface and configured to display the music-related indicator.

11. The system of claim 1, further comprising a sensory accessory operatively linked to the processor.

12. The system of claim 11, wherein the sensory accessory comprises an audio device, and the processor is configured to play the music piece on the audio device.

13. The system of claim 11, wherein the sensory accessory comprises a display device, and the processor is configured to display a notation of the music piece on the display device.

14. A method for learning, composing and playing music, the method comprising:
placing a plurality of objects next to or on top of each other on an interactive surface covered with a physical sheet to form a structural pattern, wherein each object comprises an identifier, is assigned with a music-related indicator, and is selected from a group consisting of a note rhythm object, a music pitching defining object and a music control object, and wherein the physical sheet comprises a first area labeled with graphics delineating a series of placement spaces for receiving a series of note rhythm objects and musical pitch defining objects, and a second area for receiving a series of music control objects;
recognizing the identifier and location information of an object;
deriving the music-related indicator from the identifier of the object using a database of correlation relationship between identifier and music-related indicator; and
deriving a music piece from the structural pattern, wherein the note rhythm objects and the music pitching defining objects in the first area define music notes and their durations in the musical piece, and the music control objects in the second area control playback sounds to be produced for the music piece and trigger the starting and stopping of the playback sound.

15. The method of claim 14, wherein the music-related indicator of a first object comprises a music symbol, and the method further comprises deriving the music piece in accordance with the music symbol and the location information of the first object.

16. The method of claim 15, wherein the music-related indicator for a second object comprises a programming symbol, and the method further comprises, upon the first object and the second object being placed on or near the interactive surface, programming the music symbol of the first object in accordance with the programming symbol of the second object.

17. The method of claim 15, wherein the music-related indicator for a third object comprises a music instrument symbol, and the method further comprises, upon the first object and the third object being placed on or near the interactive surface, deriving the music piece in accordance with the music symbol of the first object and the music instrument symbol of the third object.

18. The method of claim 14, wherein the identifier of the object comprises a unique identification code (UID), and the UID is encoded with a device selected from a group consisting of a radio frequency identification chip, a pattern of capacitive tabs, and a pattern of magnetic tabs.

19. The method of claim 14, wherein the identifier of the object correlates to a unique optical pattern, and the method further comprises recognizing the unique optical pattern through a camera or a sensor array operatively linked to the interactive surface.

20. The method of claim 19, further comprising pre-fabricating the unique optical pattern on the object.

21. The method of claim 19, further comprising marking the object to form the unique optical pattern.

22. The system of claim 14, wherein the identifier of the object is a music-related indicator assigned to the object.

23. The method of claim 14, further comprising displaying a music-related symbol on an electronic screen operatively linked to the interactive surface.

24. The method of claim 14, further comprising sending the music piece to a sensory accessory.

25. The method of claim 24, wherein the sensory accessory comprises an audio device and the method further comprises playing the music piece on the audio device.

26. The method of claim 24, wherein the sensory accessory comprises a display device, and the method further comprises displaying a notation of the music piece on the display device.

* * * * *